Oct. 9, 1923.
B. HALL
TRANSMISSION MECHANISM
Original Filed Sept. 2, 1913
1,470,565
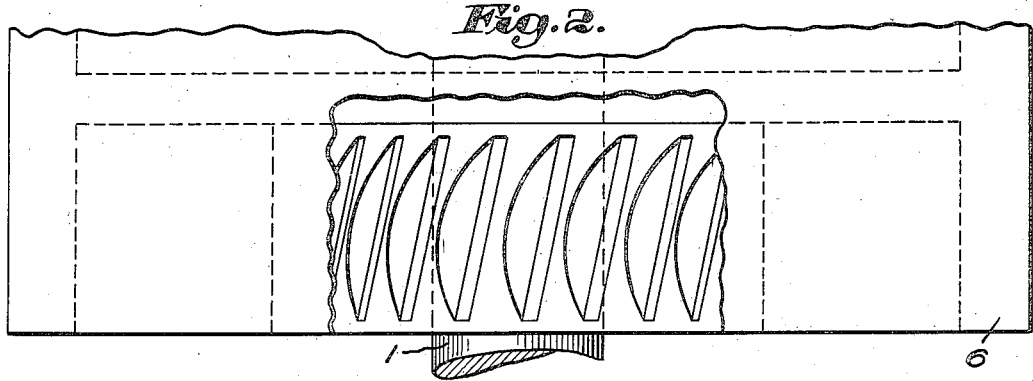
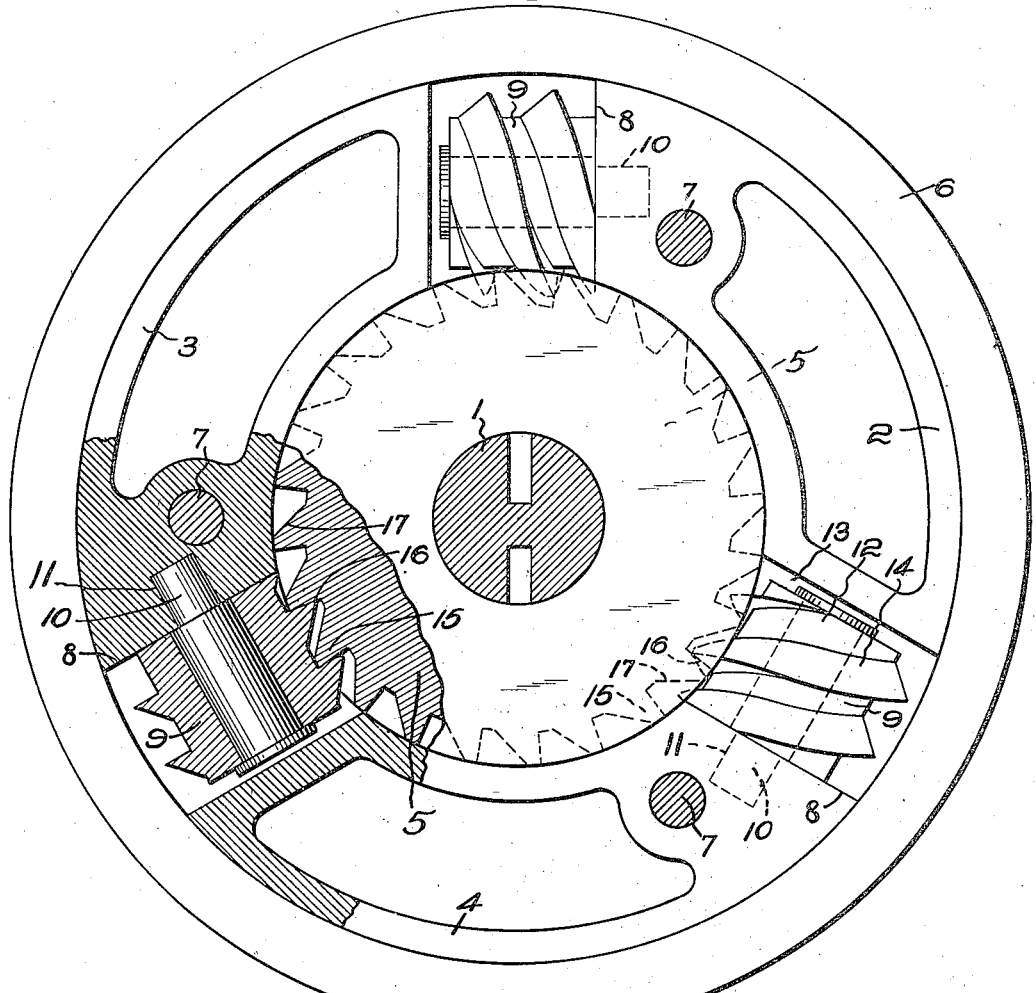

Patented Oct. 9, 1923.

1,470,565

UNITED STATES PATENT OFFICE.

BICKNELL HALL, OF ABINGTON, MASSACHUSETTS, ASSIGNOR TO HALL CO., OF BOSTON, MASSACHUSETTS, A CORPORATION OF MASSACHUSETTS.

TRANSMISSION MECHANISM.

Continuation of application Serial No. 787,620, filed September 2, 1913. This application filed January 24, 1919. Serial No. 272,809.

*To all whom it may concern:*

Be it known that I, BICKNELL HALL, a citizen of the United States, and a resident of Abington, in the county of Plymouth and State of Massachusetts, have invented an Improvement in Transmission Mechanism, of which the following description, in connection with the accompanying drawings, is a specification, like characters on the drawings representing like parts.

This application is a continuation of my co-pending application Serial No. 168,593, renewed May 14, 1917, and originally filed September 2, 1913, Serial No. 787,620.

This invention relates to transmission mechanism, an important object thereof being to provide an improved, simplified and compact contruction. The nature of my invention will best appear from a description of a single embodiment thereof selected for illustrative purposes and shown in the accompanying drawings, wherein—

Fig. 1 is a plan view partially in transverse section of one type of mechanism embodying my invention; and Fig. 2 is a side elevation of the worm gear shown in Fig. 1 and co-acting parts.

Referring to the drawings, I have at 1 indicated a main drive shaft to which power may be applied in any suitable manner and which may correspond to the drive shaft shown in my co-pending application Serial No. 768,998, filed May 21, 1913. In any suitable manner, not herein necessary to disclose, but which may be substantially as set forth in my said application, reciprocating or to and fro motion is transmitted from the said main drive shaft to a series or set of segments or blocks 2, 3, 4, which are mounted in a suitable annular guide way between a worm wheel 5 that is to be driven and a surrounding rim 6 preferably integral with said worm wheel, the term "reciprocate" being herein employed in a broad and generic sense. For this purpose, I have herein represented each segment as having a stud 7 to which studs links may be connected similar to those shown in my said application and which may be operated through eccentrics or otherwise to impart the desired reciprocation or to and fro movements to the said segments. If desired, two series of segments may be employed to cooperate with a double series of worm teeth as shown in my said application, the said two series of segments being reciprocated in opposite phase so that one series or the other thereof is acting as a driver so long as the mechanism is in operation.

I have herein represented the part to be driven as the worm wheel 5, from which motion may be transmitted in any suitable manner, as, for example, in the manner shown in my said application.

In order to impart rotation in one direction to the worm wheel or gear or driven element 5, I have provided each of the segments 2, 3, 4 at the end face 8 thereof with a worm 9 loosely mounted upon a stud 10 received in a suitable socket 11 in the said end face of the segment. Each worm 9 is provided with a thread 12 having differing or contrasting faces. I have herein represented the rear face 13 as radial or substantially radial to the axis of the worm and the opposite face 14 as inclined. The worm wheel or gear 5 is provided with inclined worm teeth 15 each having a substantially radial face 16 and an inclined face 17. The faces 16 are radial to the axis of the shaft 1 with respect to any cutting plane normal to the axis of the said shaft but are inclined transversely as represented in Fig. 2.

The construction of the teeth of the worm wheel and of the thread of the worms is such that when the illustrated set of segments is moved in a contra-clockwise direction viewing Fig. 1, the worms are moved axially in said contra-clockwise direction and the leading or inclined faces 14 thereof engage the inclined faces 17 of the teeth of the worm wheel and impart rotative movement to the latter. When, however, the segments are moved in a clockwise direction, the said worms move axially in such direction and the rear or radial faces 13 of the threads 12 thereof engage the substantially radial faces of the worm wheel 5 and consequently the worms turn idly upon their studs 10.

During the movement of the illustrated set of segments in a contra-clockwise direction the other set of segments, if employed, is moved in the opposite direction, so that the worms thereof ride idly along the face of the worm wheel, whereby during the idle movement of the illustrated worms 9 the other set of worms imparts rotative movement to the worm wheel. Thus the worm wheel is continuously driven in one direction.

The speed of the worm wheel may be varied in the manner described in my said application.

It will be observed that the worms are in constant meshing engagement with the worm wheel, that is, during both the driving and idle movements of the former; and that the worm wheel is driven, in one direction only, by the bodily movement of the worms in or substantially in the direction of their axes.

Having thus described one illustrative embodiment of my invention, I desire it to be understood that although specific terms are employed, they are used in a generic and descriptive sense and not for purposes of limitation, the scope of the invention being set forth in the following claims:

1. Transmission mechanism comprising in combination a worm gear and a co-acting, constantly meshing, reciprocable driving worm having a continuous thread with differing or contrasting faces, of such pitch and inclination relative to the worm axis that the thrust of one of said faces upon the worm gear is effective to drive said gear, and of the other of said faces to cause idle rotation of said worm.

2. Transmission mechanism comprising in combination, an element to be driven and a driving worm in constant mesh therewith and having a thread with differing or contrasting faces, said worm being of substantially the same diameter throughout its length and being mounted for to and fro movement.

3. Transmission mechanism comprising in combination, a worm gear and a co-acting, reciprocable driving worm in constant mesh therewith having a thread provided with a substantially radial face and an inclined face.

4. Transmission mechanism comprising in combination, a worm gear having teeth with differing or contrasting faces and a co-acting driving worm, the thread of which has correspondingly differing or contrasting faces, and means to maintain the axes of the worm gear and worm in substantially fixed relation, said worm being reciprocable.

5. Transmission mechanism comprising in combination, a worm gear having teeth provided with radial and inclined faces, a co-acting driving worm, the thread of which has radial and inclined faces, and means to maintain the axes of the worm gear and worm in substantially fixed relation, said worm being reciprocable.

6. Transmission mechanism comprising in combination, a worm gear having teeth provided with substantially radial and inclined faces and a co-acting, reciprocable driving worm constantly in mesh therewith and the thread of which has a substantially radial non-driving face and an inclined driving face.

7. Transmission mechanism comprising in combination, a worm gear having an annular guide way, a block movable to and fro therein, and a worm mounted upon said block and having a thread with differing or contrasting faces co-acting with said worm gear.

8. Transmission mechanism comprising in combination, a worm gear having a surrounding annular guide way, a plurality of blocks, movable to and fro therein, and worms mounted upon said blocks and having threads with differing or contrasting faces co-acting with said worm gear.

9. Transmission mechanism comprising in combination, a worm gear having a surrounding annular guide way, a plurality of blocks movable to and fro therein and worms loosely mounted upon said blocks and having substantially radial and inclined thread faces co-acting with said worm gear.

10. Transmission mechanism comprising in combination, a worm gear, a co-acting, constantly meshing, driving worm having a thread with an inclined driving face and a substantially radial, non-driving face, the driving face so engaging said gear that thrust thereof upon said gear rotates the latter and that relative rotation of said gear in a direction opposite to such rotation is prevented, and the other of said faces so engaging said gear that thrust thereof upon said gear causes idle rotation of the worm and that relative rotation of said gear in a direction opposite to that which would be produced by said thrust is permitted.

11. Transmission mechanism comprising in combination, a worm gear and a co-acting, reciprocable, constantly meshing, driving worm having a thread with an inclined, driving face and a substantially radial, non-driving face.

12. Transmission mechanism comprising in combination, a worm gear and a co-acting, reciprocable, driving worm having a thread with an inclined, driving face and a substantially radial, non-driving face.

13. Transmission mechanism comprising in combination, a worm gear having teeth provided with inclined, drive-receiving faces and substantially radial, opposed faces, and a co-acting, reciprocable, driving worm having a thread with an inclined, driving face and a substantially radial, non-driving face.

14. Transmission mechanism comprising in combination, a worm gear having teeth provided with radial and inclined faces, a co-acting, reciprocable worm, the thread of which has radial and inclined faces, and means to hold the axes of the worm and worm gear in fixed relation.

15. Transmission mechanism comprising in combination a worm gear and a coacting reciprocable driving worm in constant mesh therewith and having spires of uniform diameter, each of said spires being provided with a substantial radial face and an inclined face.

16. Transmission mechanism comprising in combination a worm gear and a coacting constantly meshing reciprocable driving worm, all the spires whereof are provided with differing or contrasting faces.

17. Transmission mechanism comprising in combination a worm gear and a coacting constantly meshing reciprocable driving worm having the spires of uniform diameter throughout, and all of said spires provided with a thread having differing or contrasting faces.

In testimony whereof, I have signed my name to this specification.

BICKNELL HALL.